(12) United States Patent
Miki et al.

(10) Patent No.: US 9,327,795 B2
(45) Date of Patent: May 3, 2016

(54) OPERATING DEVICE

(71) Applicant: Shimano Inc., Sakai, Osaka (JP)

(72) Inventors: Yoshimitsu Miki, Osaka (JP); Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/201,568

(22) Filed: Mar. 7, 2014

(65) Prior Publication Data

US 2014/0290420 A1    Oct. 2, 2014

(30) Foreign Application Priority Data

Mar. 29, 2013    (JP) ................. 2013-072861

(51) Int. Cl.
    *B62K 23/06*     (2006.01)
    *B62M 25/04*     (2006.01)
    *B62K 23/00*     (2006.01)

(52) U.S. Cl.
    CPC ............... *B62K 23/06* (2013.01); *B62K 23/00* (2013.01); *B62M 25/04* (2013.01); *Y10T 74/20396* (2015.01)

(58) Field of Classification Search
    CPC ....... B62M 25/04; B62K 23/06; B62K 23/00; Y10T 74/20396
    USPC ............... 74/473.14, 488, 491, 502.2, 551.8; 200/61.88; 280/288.4
    See application file for complete search history.

(56) References Cited

U.S. PATENT DOCUMENTS

| | | | | |
|---|---|---|---|---|
| 5,429,012 A | * | 7/1995 | Ikeda | B62M 25/045 74/473.13 |
| 5,577,413 A | * | 11/1996 | Tagawa | B62K 23/04 74/473.14 |
| 5,860,326 A | | 1/1999 | Lussier | |
| 6,055,882 A | | 5/2000 | Arbeiter et al. | |
| 7,024,959 B2 | * | 4/2006 | Tetsuka | B62M 25/02 474/70 |
| 7,650,813 B2 | * | 1/2010 | Tsumiyama | 74/502.2 |
| 7,806,022 B2 | * | 10/2010 | Hara | B62K 23/06 74/502.2 |
| 8,695,454 B2 | * | 4/2014 | Tsumiyama | 74/551.8 |
| 2006/0053940 A1 | | 3/2006 | McLaughlin et al. | |
| 2009/0158881 A1 | * | 6/2009 | Shahana | 74/502 |
| 2013/0008751 A1 | | 1/2013 | Dunlap, III | |
| 2014/0208887 A1 | * | 7/2014 | Kosaka et al. | 74/523 |
| 2014/0354038 A1 | * | 12/2014 | Kosaka et al. | 307/9.1 |
| 2015/0000455 A1 | * | 1/2015 | Hirotomi et al. | 74/491 |

FOREIGN PATENT DOCUMENTS

EP    1 992 556 A1    11/2008
FR    2 657 062 A1    7/1991

* cited by examiner

*Primary Examiner* — Adam D Rogers
(74) *Attorney, Agent, or Firm* — Global IP Counselors

(57) ABSTRACT

An operating device is provided that is configured to be attached to a handlebar of a bicycle. The operating device includes a first operating unit and a second operating unit. The first operating unit includes a first input part and a fixing part configured to be fixed on the handlebar. The second operating unit includes a second input part that is rotationally arranged around an axis of the handlebar. The second operating unit is detachably attached on the first operating unit.

18 Claims, 4 Drawing Sheets

OPERATING DEVICE

CROSS-REFERENCE TO RELATED APPLICATIONS

This application claims priority to Japanese Patent Application No. 2013-072861 filed on Mar. 29, 2013. The entire disclosure of Japanese Patent Application No. 2013-072861 is hereby incorporated herein by reference.

BACKGROUND

1. Field of the Invention

This invention generally relates to a bicycle operating device for operating bicycle components of a bicycle. More specifically, the present invention relates to a bicycle operating device having a first operating unit and a second operating unit.

2. Background Information

As disclosed in, for example, U.S. Patent Application Publication No. 2013/0008751, a brake operating device is attached to the handlebar of the bicycle is well known. In addition, as disclosed in, for example, U.S. Patent Application Publication No. 2006/0053940 and U.S. Pat. No. 6,055,882, a gear shift operating device is also attached.

SUMMARY

For the conventional brake operating device and the conventional gear shift operating device, attaching them respectively on the handlebar is necessary, and the periphery of the grip of the handlebar cannot be formed in a simple way.

One aspect is to provide a bicycle operating device that simplifies the configuration on the handlebar.

The operating device related to the present invention is an operating device attached to the handlebar of a bicycle. The operating device comprises a first operating unit and a second operating unit. The first operating unit includes a first input part and a fixing part fixed to the handlebar. The second operating unit includes a second input part that is arranged in a rotatable way on the handlebar. The second operating unit is detachably attached on the first operating unit.

With this operating device, as needed, the second operating unit can be attached to/detached from the first operating unit. Consequently, even when the second operating unit is adopted, there is still no need to separately prepare a member for fixing the second operating unit to the handlebar, so that the configuration on the handlebar can be simplified. In addition, as the second operating unit has a second input part that can be rotated on the handlebar; it is possible to form the device to be more compact than in the case when the rotating shaft of the second input part is arranged as a separate shaft. This feature also simplifies the configuration on the handlebar.

The second operating unit may also be attached to be adjusted around the axis of the handlebar with respect to the first operating unit. In this case, the relative positions of the second input part of the second operating unit and the first input part of the first operating unit can be set preferably corresponding to the preference and physique of the user.

The second operating unit may also have a main body that is formed into an annular shape and configured to receive the handlebar therein. In this case, it is possible to suppress the tendency of bulging of the second operating unit in the radial direction of the handlebar, so that the configuration of the handlebar can be simplified.

The fixing part may also include a clamp for holding the handlebar. In this case, the first operating unit and the entirety of the operating device can be reliably fixed on the handlebar.

The first operating unit may also have an opposed part opposed to the clamp to form a space between the first operating unit and the clamp, and the main body of the second operating unit may be arranged in the space. In this case, the main body of the second operating unit can be positioned in the axial direction of the handlebar by the clamp and the opposed part.

One may also adopt a scheme in which there is a through hole connecting to the space arranged on one of the clamp and the opposed part, and the operating device also has an attaching member inserted in the through hole for attaching the main body of the second operating unit on the first operating unit. In this case, with the attaching member, it is easy to attach the second operating unit on the first operating unit.

The attaching member may press the main body of the second operating unit towards the other of the clamp and the opposed part. In this case, the second operating unit can be easily positioned in the axial direction of the handlebar with respect to the first operating unit and fixed there.

The attaching member may also have a fitting part fit in the main body of the second operating unit. In this case, the second operating unit can be easily positioned around the axis of the handlebar with respect to the first operating unit and fixed there.

The main body of the second operating unit may also have a fitted section that allows the fitting part of the attaching member to fit at any one of the plural positions around the axis of the handlebar. In this case, the second operating unit can be easily adjusted around the axis of the handlebar with respect to the first operating unit.

The through hole may also be formed on the opposed part, and the pressing part presses the main body towards the clamp. In this case, by pressing the main body towards the clamp that is fixed on the handlebar, it is possible to have the second operating unit attached to the first operating unit with an even higher degree of stability.

The attaching member may also be inserted in the through hole. In this case, attaching the attaching member so that it can move with respect to the first operating unit is easy.

The opposed part may also be formed into an annular shape so that the handlebar can be inserted. In this case, it is possible to hold the main body of the second operating unit even more reliably by the clamp and the opposed part, and it is possible to attach the second operating unit on the first operating unit with an even higher degree of stability.

The second input part may also include at least one lever member. In this case, carrying out the input operation for the second input part with the lever is easy. The second input part preferably has two lever members.

The second operating unit may also be adopted fir the electrical operation of an electric member of the bicycle. In this case, operating, for example, the electric gear changing device or the like with the operating unit on the simply configured handlebar is easy.

The fixing part may include a master cylinder that can accommodate a piston in a movable way, and the first input part may include a lever connected to the piston. In this case, it is possible to manipulate, for example, a hydraulic brake device from the unit on the handlebar with a simplified configuration.

Another operating device related to the present invention is an operating device attached to the handlebar of a bicycle. The operating device comprises a first operating unit and a second operating unit. The first operating unit includes a first input part, a fixing part, which includes a clamp fir holding the handlebar and is fixed on the handlebar, and an opposed part arranged opposed to the clamp in the axial direction of the handlebar so that a space is formed between the opposed part and the clamp. The second operating unit is arranged at least partially in the space and is attached to the first operating unit.

With this operating device, as needed, the second operating unit can be attached to/detached from the first operating unit having a fixing part. Consequently, even when the second operating unit is adopted, there is still no need to separately prepare a member for fixing the second operating unit on the handlebar, so that the configuration of the handlebar can be simplified. In addition, the main body of the second operating unit can be positioned in the axial direction of the handlebar by the clamp and the opposed part.

The second operating unit may be attached to/detached from the first operating unit. In this case, it is possible to select the second operating unit with any desired function.

Also other objects, features, aspects and advantages of the disclosed operating device will become apparent to those skilled in the art from the following detailed description, which, taken in conjunction with the annexed drawings, discloses one embodiment of the operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
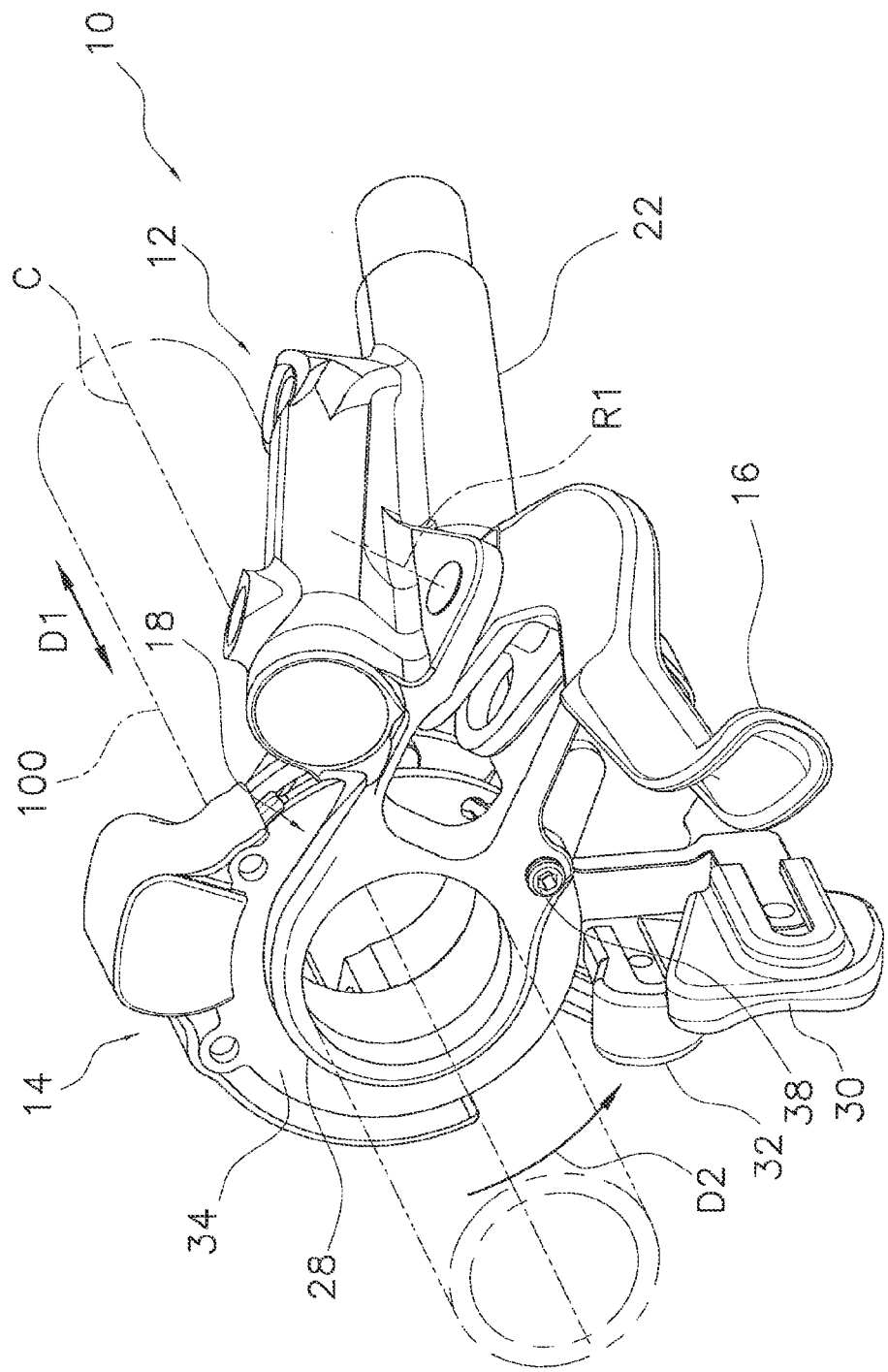
FIG. 1 is a perspective view of a bicycle operating device in accordance with one illustrated embodiment.
Figure 2:
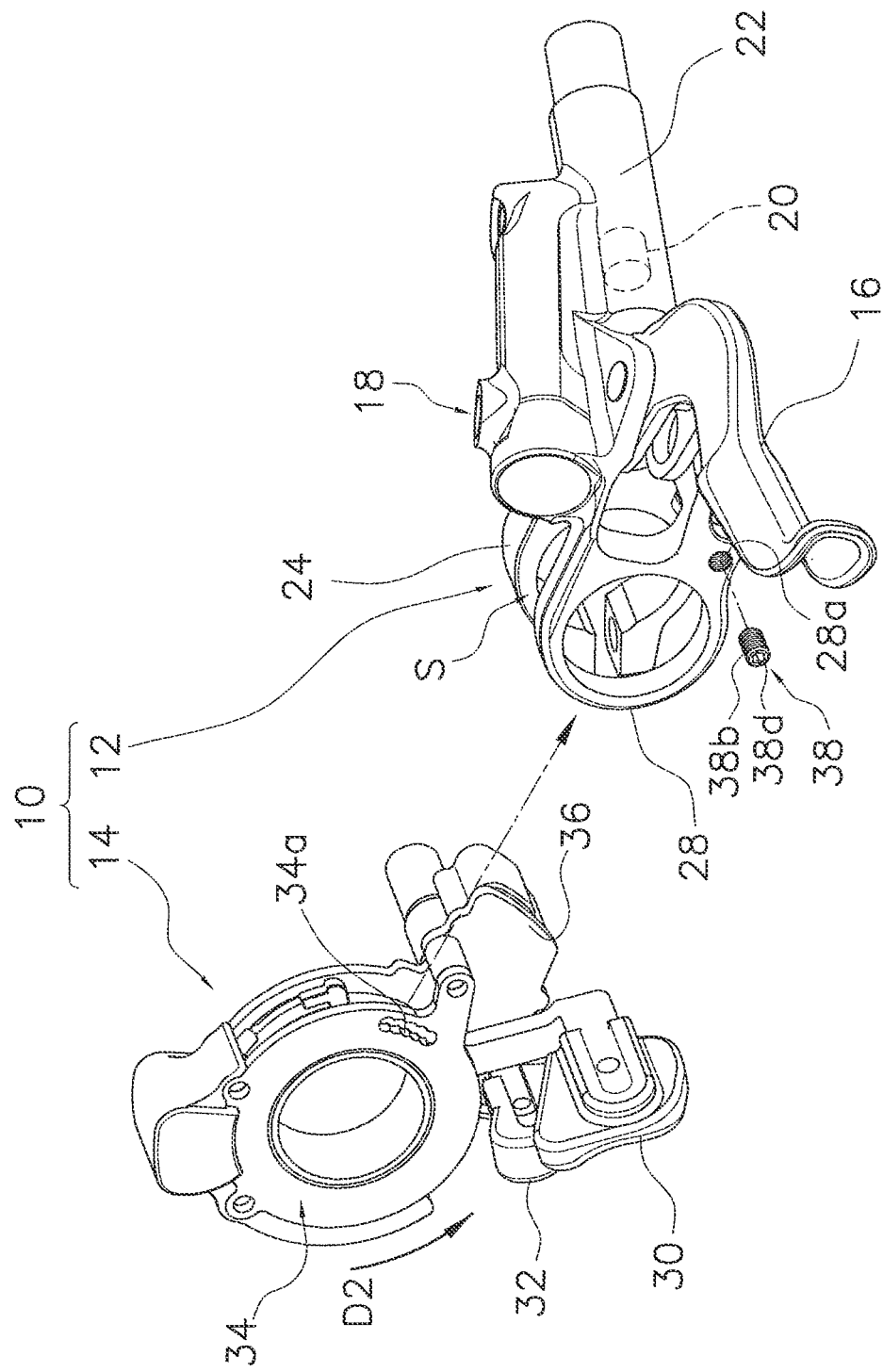
FIG. 2 is an exploded perspective view of the operating device.
Figure 3:
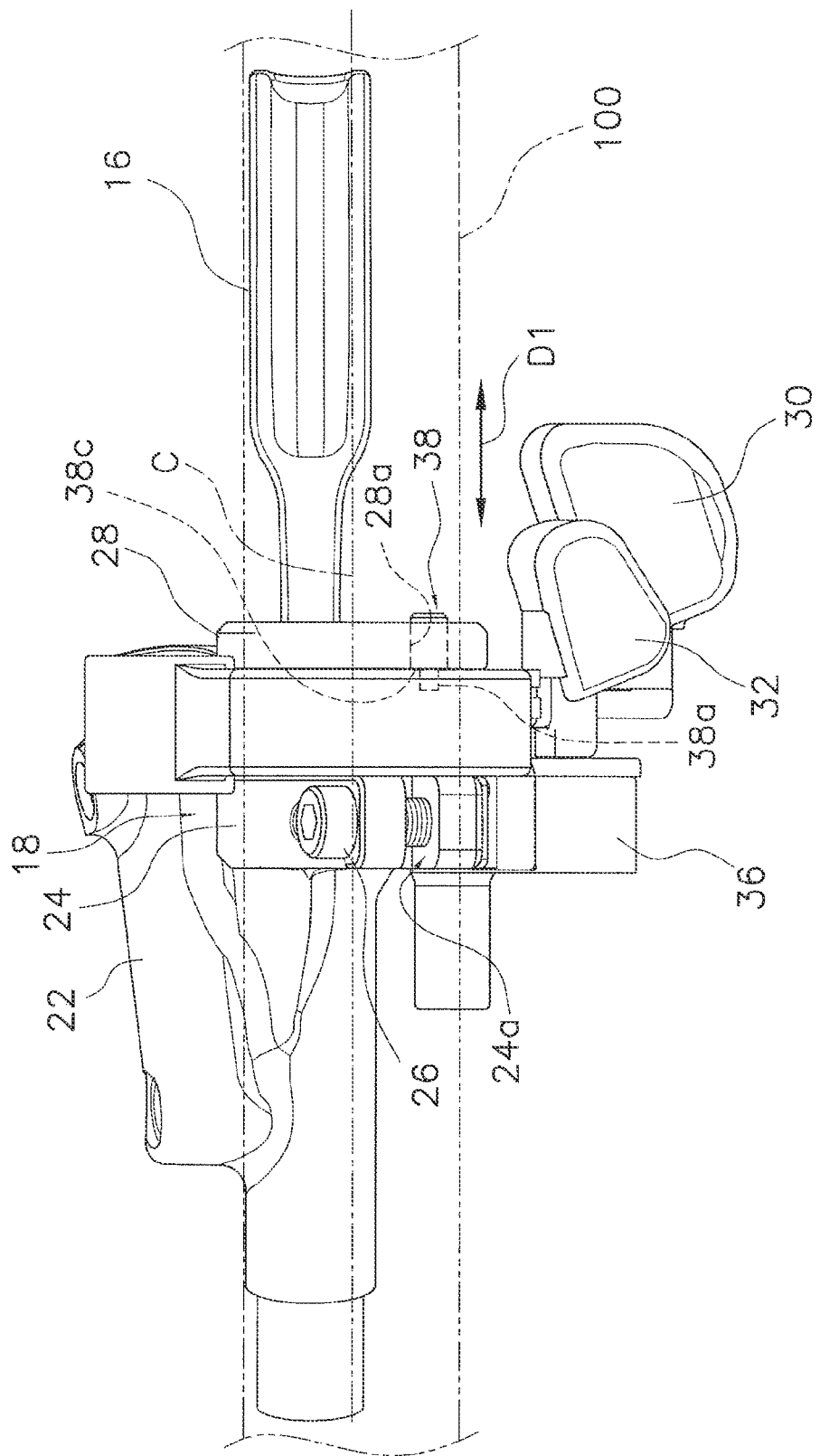
FIG. 3 is a rear elevational view of the operating device.

Referring initially to FIGS. 1, 2 and 3, an operating device 10 is illustrated in accordance with a first embodiment. The operating device 10 is attached to a handlebar 100 of the bicycle. The operating device 10 comprises a first operating unit 12 (a brake operating unit) for operating a brake device and a second operating unit (a gear shift operating unit) 14 for operating the electric gear shifting device.

The first operating unit 12 includes a lever 16 (a brake lever) and a fixing part 18. The lever 16 constitutes a first input part. The fixing part 18 is configured to be fixed on the handlebar 100. The fixing part 18 includes a master cylinder 22 and a clamp 24. The fixing part 18 accommodates a movable piston 20. The clamp 24 holds the handlebar 100 using a bolt 26 that decreases a space of the slit 24a of the clamp 24. As a result, the fixing part 18 is fixed on the handlebar 100. Also, the fixing part 18 includes an opposed part 28. The opposed part 28 is spaced from the clamp 24 in an axial direction D1 of the fixing part 18 and the handlebar 100. In this way, a space S (see FIG. 2) is formed between the opposed part 28 and the clamp 24. The opposed part 28 is formed into an annular shape so that the handlebar 100 can be inserted therein.

The lever 16 is pivotally attached on the fixing part 18 to pivot around a rotating axis R1. The lever 16 is connected to the piston 20, which is arranged inside of the master cylinder 22, via a piston rod (not shown). The piston 20 moves within the master cylinder 22 in response to the lever 16 being pivoted. In this way, the oil or other fluid is extruded out of the master cylinder 22. As a result, the hydraulic disk brake device (not shown), which is fluidly attached to the master cylinder 22 operated. Such an operating system is well known and, therefore, will not be explained in detail herein.

The second operating unit 14 includes two levers 30 and 32 (gear-shift operating levers) and a main body 34. The levers 30 and 32 constitute a second input part. The main body 34 is formed into an annular shape and is configured so that the handlebar 100 can be inserted therein. The main body 34 is disposed in the space S between the clamp 24 and the opposed part 28. With the main body 34 is disposed in the space S, the main body 34 is arranged concentric to the clamp 24 and the opposed part 28. The dimension of the axial direction D1 of the main body 34 is set to be a slightly smaller than the space S. As a result, while the main body 34 is arranged in the space S, the main body 34 makes contact with the axially facing surfaces of the fixing part 18 and the opposed part 28, respectively.

The levers 30 and 32 are arranged on the main body 34 so that they can rotate around a central axis C (i.e., a center longitudinal axis of the handlebar 100) of the main body 34. The lever 30 is arranged on the main body 34 to be able to rotate alone around the central axis C. The lever 30 is configured to be pressed from a predetermined initial position in an operating direction D2 towards an operated position. The lever 30 is biased by a biasing element (not shown) in a direction opposite to the operation direction D2. In this way, the lever 30 can return to the initial position after being operated and released. In other words, the lever 30 is configured as a trigger lever. On the other hand, the lever 32 is arranged on an upstream side of the operation direction D2 with respect to the lever 30. The lever 32 is arranged to rotate in the operation direction D2. When the lever 32 is rotated in the operation direction D2, the lever 30 is also rotated in the operation direction D2. The lever 32 is also formed as a trigger lever just as the lever 30.

As shown in FIGS. 2 and 3, the main body 34 has a sensor unit 36. The sensor unit 36 outputs prescribed signals corresponding to the rotation of the lever 30 and the rotation of lever 32, respectively. More specifically, when the lever 30 is rotated in the operation direction D2, a first signal is output, and when the lever 32 is rotated together with the lever 30 in the operation direction D2, a second signal is output. The first signal or the second signal is sent as, for example, a shift-up signal to an electric gear-shifting device (not shown) that is attached to the bicycle. The other one of the first and second signals is sent as, for example, a shift-down signal to the electric gear changing device. In other words, the second operating unit 14 is constructed to perform electric control operation for the electric gear changing device or another electric member of the bicycle. Here, the second operating unit 14 has the same configuration as that of the operating device disclosed in U.S. patent application Ser. No. 13/755,462.

Figure 4:
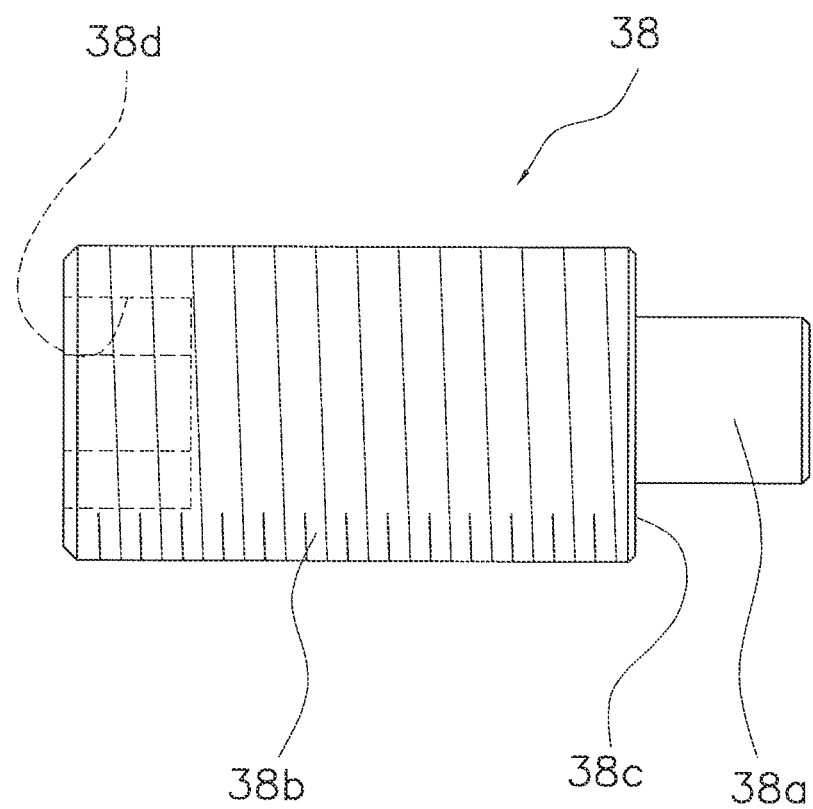
FIG. 4 is a side elevational view of the operating device.

The second operating unit 14 is attached detachably on the first operating unit 12 by a cylindrical-shaped attaching member 38. As shown in FIG. 4, the attaching member 38 includes a fitting part 38a, a threaded part 38b, a pressing part 38c and a tool engagement part 38d. The fitting part 38a is arranged on one end portion of the attaching member 38. The fitting part 38a fits into the main body 34 of the second operating unit 114. The threaded part 38*b* is formed with a diameter larger than the fitting part 38*a*. The pressing part 38*c* is formed as a shoulder portion between the fitting part 38*a* and the threaded part 38*b*. The tool engagement part 38*d* is formed on the other end portion of the attaching member 38.

As shown in FIG. 2, the attaching member 38 is inserted in a through hole 28*a* that is formed on the opposed part 28 of the first operating unit 12. In this way, the attaching member 38 extends into the space S. According to the present embodiment, the through hole 28*a* is a threaded hole formed by a threaded opening. The attaching member 38 is threaded in the through hole 28*a* by the threaded part 38*b* being threaded into the threaded opening of the through hole 28*a*.

The fitting part 38*a* of the attaching member 38 is fit in the fitting part 34*a* of the main body 34. The fitting part 34*a* of the main body 34 is formed so that the fitting part 38*a* of the attaching member 38 can fit in any one of the plural positions around the axis C. By changing the fitting position of the fitting part 38*a* on the fitting part 34*a*, it is possible to change the position of the second operating unit 14 around the handlebar axis C with respect to the first operating unit 12. That is, the second operating unit 14 is attached to the first operating unit 12 to be able to be adjusted around the axis C of the handlebar 100 with respect to the first operating unit 12. In this embodiment, the fitting part 34*a* has a shape in which the fitting part 34*a* has six circularly shaped openings that are connected in an arc shaped pattern around the axis C of the handlebar 100. In this way, the position of the second operating unit 14 can be adjusted in six steps around the axis C with respect to the first operating unit 12. Here, the shape of the fitted section is not limited to this shape, and one may also adopt a scheme in which, for example, a plurality of independent through holes that are arranged as the fitted section.

In the operating device 10, the second operating unit 14 is attached and fixed on the first operating unit 12 as follows. First, the attaching member 38 is unscrewed from the through hole 28*a* to move to a side of the space S. Thus, with the attaching member 38 in this position, the second operating unit 14 can be inserted into the space S. The fitting part 38*a* then can be fit into any one of the positions of the fitting part 34*a* by screwing the attaching member 38 into the through hole 28*a*. By screwing the attaching member 38 into the through hole 28*a*, the pressing part 38*c* presses the side surface of the main body 34 towards the clamp 24. As a result, the second operating unit 14 is attached and fixed on the first operating unit 12. When the position of the second operating unit 14 around the axis C is to be adjusted, the attaching member 38 is loosened, and the second operating unit 14 is rotated around the axis C so that the fitting part 38*a* is fit in another position of the fitting part 34*a*. Then, the attaching member 38 is fastened again. As a result, the position of the second operating unit 14 can be easily adjusted while the first operating unit 12 is fixed on the handlebar 100.

With the operating device 10 of this configuration, even when the second operating unit 14 is in use, there is still no need to prepare a separate member for fixing the second operating unit 14 on the handlebar 100, so that the configuration on the handlebar 100 can be simplified. Also, since the levers 30 and 32 can rotate around the axis C of the handlebar 100, it is possible to form a device to be more compact than that when the rotating axis of the lever is arranged to rotate about an axis separate from the handlebar 100. With this feature, the configuration on the handlebar 100 can be simplified. In addition, by using the operating device 10, the main body 34 of the second operating unit 14 can be easily and reliably positioned in the axial direction D1 of the handlebar 100 by means of the clamp 24 and the opposed part 28.

Other Embodiments

The previous discussion explained one embodiment of the present invention. However, the present invention is not limited to this embodiment. As long as the scope of the present invention is observed, various modifications can be made. In addition, the plural embodiments and their modified versions described in the present specification can be combined at will as needed.

(a) In this embodiment, an explanation has been made for the case when the second operating unit is formed electrically. However, the present invention is not limited to this configuration. One may also adopt a scheme in which the second operating unit is the so-called mechanical gear-shift operating device for operating the gear-shift cable.

(b) In this embodiment, the second input part of the second operating unit is a lever rotated around the axis of the handlebar. However, the present invention is not limited to this configuration. For example, one may also adopt a scheme in which the first input part is arranged to be rotated around an axis different from that of the handlebar.

(c) In this embodiment, an explanation has been made for the case when the second operating unit is arranged in the space between the clamp and the opposed part. However, the present invention is not limited to this configuration. In this case, a second operating unit having an input section that can be rotated around the axis of the handlebar and functions as the grip of the bicycle can be used. That is, the second operating unit of the present invention may also include the so-called twist gear-shift operating device.

(d) In this embodiment, the first operating unit is of the hydraulic type. However, the first operating unit may also be of a type that is connected to a cable for brakes. That is, the first operating unit may also the so-called mechanical brake operating device for operating the cable for the brake operation.

(e) In this embodiment, the previous explanation is made in the case when the first operating unit is formed as a brake operating unit (device), and the second operating unit is formed as a gear-shift operating unit. However, the present invention is not limited to this scheme. The first operating unit and the second operating unit may have a configuration so that they can manipulate any device, respectively. For example, one may also adopt a scheme in which the first operating unit is formed as a gear-shift operating device, and the second operating unit is formed as a suspension operating unit.

Thus, the foregoing descriptions of the embodiments according to the present invention are provided for illustration only, and not for the purpose of limiting the invention as defined by the appended claims and their equivalents.

What is claimed is:

1. An operating device configured to be attached to a handlebar of a bicycle, the operating device comprising:
    a first operating unit including a first input part and a fixing part configured to be fixed on the handlebar; and
    a second operating unit including a main body and a second input part, the main body formed into an annular shape and configured to receive the handlebar therein, the main body being detachably attached to the first operating unit, the second input part being movably supported on the main body such that the second input part moves with respect to the main body and rotates around a longitudinal centerline of the handlebar, the second operating unit being adjustably attached in a direction around the longitudinal centerline of the handlebar with respect to the first operating unit.

2. The operating device according to claim 1, wherein the fixing part has a clamp for holding the handlebar.

3. The operating device according to claim 2, wherein the first operating unit further has an opposed part opposed to the clamp so that a space is formed between the opposed part and the clamp, and
the main body of the second operating unit is disposed in the space.

4. The operating device according to claim 3, wherein one of the clamp and the opposed part has a through hole that communicates with the space, and an attaching member is inserted in the through hole for attaching the main body of the second operating unit to the first operating unit.

5. The operating device according to claim 4, wherein the attaching member is screwed in the through hole.

6. The operating device according to claim 3, wherein the opposed part is formed into an annular shape so that the handlebar can be inserted.

7. The operating device according to claim 1, the second input part includes at least one lever member.

8. The operating device according to claim 7, wherein the at least one lever member includes two lever members.

9. The operating device according to claim 1, wherein the second operating unit is configured to electrically operate an electric member of the bicycle.

10. The operating device according to claim 1, wherein the fixing part includes a master cylinder that accommodates a movable piston, and
the first input part includes a lever connected to the piston.

11. An operating device configured to be attached to a handlebar of a bicycle, the operating device comprising:
a first operating unit including a first input part, a fixing part, and an opposed part, the fixing part including a clamp configured to be fixed on the handlebar, the opposed part being opposed to the clamp so that a space is formed between the opposed part and the clamp; and
a second operating unit detachably attached to the first operating unit, the second operating unit including a main body and a second input part, the main body being formed into an annular shape and configured to receive the handlebar therein, the main body being disposed within the space between the opposed part and the clamp, the second input part being arranged to rotate around a longitudinal centerline of the handlebar,
one of the clamp and the opposed part having a through hole that communicates with the space,
an attaching member being inserted in the through hole for attaching the main body of the second operating unit to the first operating unit,
the attaching member includes a pressing part that presses the main body of the second operating unit towards the other of the clamp and the opposed part.

12. The operating device according to claim 11, wherein the attaching member further includes has a fitting part that fits into the main body of the second operating unit.

13. The operating device according to claim 12, wherein the second operating unit is adjustably attached in a direction around the longitudinal centerline of the handlebar with respect to the first operating unit.

14. The operating device according to claim 13, wherein the main body of the second operating unit has a fitted section arranged so that the fitting part of the attaching member can fit in any one of a plurality of positions around the longitudinal centerline of the handlebar.

15. The operating device according to claim 11, wherein the through hole is arranged on the opposed part, and the pressing part presses the main body towards the clamp.

16. An operating device configured to be attached to a handlebar of a bicycle, the operating device comprising:
a first operating unit including a first input part, a fixing part including a clamp that holds the handlebar and fixed on the handlebar, and an opposed part opposed to the clamp in an axial direction of the handlebar so that a space is formed between the opposed part and the clamp, the opposed part and the clamp being provided as a one-piece unitary member; and
a second operating unit arranged at least partially in the space and attached to the first operating unit.

17. The operating device according to claim 16, wherein the second operating unit is detachably attached to the first operating unit.

18. An operating device configured to be attached to a handlebar of a bicycle, the operating device comprising:
a first operating unit including a first input part, a fixing part including a clamp that holds the handlebar to fix the fixing part on the handlebar, and an annular opposed part arranged concentric to the clamp and separated from the clamp in an axial direction of the handlebar so that an axial space is formed between the opposed part and the clamp; and
a second operating unit including an annular main body, the main body being configured and dimensioned to be inserted at least partially into the axial space and attached to the first operating unit while the opposed part is fixed to the clamp, the main body being concentric with respect to the clamp and the opposed part.

* * * * *